United States Patent
Kleideiter et al.

(10) Patent No.: US 7,727,632 B2
(45) Date of Patent: Jun. 1, 2010

(54) GLASS COATING

(75) Inventors: Gerd Kleideiter, Ahaus (DE); Anton Zmelty, Hosbach (DE); Armin Reus, Freigericht (DE); Manfred Ruske, Kerpen (DE); Michael Geisler, Wachtersbach (DE)

(73) Assignee: Applied Materials GmbH & Co. KG., Alzenau (DE)

( * ) Notice: Subject to any disclaimer, the term of this patent is extended or adjusted under 35 U.S.C. 154(b) by 295 days.

(21) Appl. No.: 10/589,157

(22) PCT Filed: Apr. 3, 2004

(86) PCT No.: PCT/EP2004/003570

§ 371 (c)(1), (2), (4) Date: Oct. 18, 2006

(87) PCT Pub. No.: WO2005/097697

PCT Pub. Date: Oct. 20, 2005

(65) Prior Publication Data

US 2007/0172647 A1  Jul. 26, 2007

(51) Int. Cl.
*B32B 9/00* (2006.01)

(52) U.S. Cl. ............... 428/432; 428/701; 428/702; 428/426; 428/428; 428/689; 428/697; 428/698; 428/699; 428/213; 428/448

(58) Field of Classification Search ............ None
See application file for complete search history.

(56) References Cited

U.S. PATENT DOCUMENTS

| 5,543,229 | A | 8/1996 | Ohsaki et al. |
| 6,689,475 | B1 | 2/2004 | Lin |
| 7,153,595 | B2 | 12/2006 | Schicht et al. |
| 2002/0064662 | A1* | 5/2002 | Lingle et al. ............ 428/432 |
| 2003/0180546 | A1 | 9/2003 | Stachowiak et al. |
| 2004/0053068 | A1 | 3/2004 | Schicht et al. |
| 2005/0123772 | A1* | 6/2005 | Coustet et al. ........... 428/432 |

FOREIGN PATENT DOCUMENTS

| DE | 195 41 014 A | 5/1997 |
| EP | 0 546 302 A1 | 6/1993 |
| EP | 0 530 676 B1 | 1/1996 |
| EP | 0 962 429 B1 | 12/1999 |
| JP | 2000132824 | 5/2000 |
| WO | WO 02/42234 A1 | 5/2002 |
| WO | WO-02-048065 * | 6/2002 |
| WO | WO-02/092527 A | 11/2002 |

* cited by examiner

*Primary Examiner*—Ling Xu
(74) *Attorney, Agent, or Firm*—Fulbright & Jaworski LLP

(57) ABSTRACT

The invention relates to a coating for temperable substrates, in particular of glass panes. This coating comprises for example directly on the substrate an $Si_3N_4$ layer, thereon a CrN layer, thereon a $TiO_2$ layer and lastly an $Si_3N_4$ layer.

10 Claims, 1 Drawing Sheet

GLASS COATING

Figure 1:
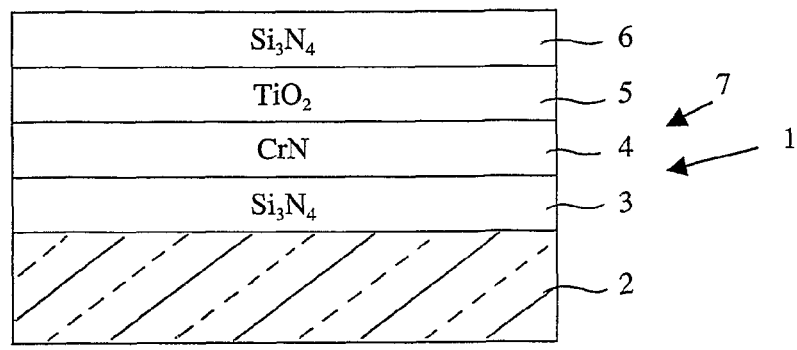

This application is a 371 of PCT/EP2004/003570 filed Apr. 3, 2004.

The invention relates to a glass coating according to the preamble of patent claim 1.

Window glass is often provided with coatings which serve as a protection against the sun. These coatings comprise materials which reduce the transmission of visible light and largely reflect or absorb the heat-generating infrared rays. In countries with high insolation a very high proportion of the visible light is intentionally not allowed to pass. Panes are customarily offered for sale whose light transmission is approximately 8 to 50%.

Window glass, as a rule, is flat. However, there are also applications in which the window glass must be curved, for example in the case of round, semi-round or oval bay windows.

The process of coating bent glass uniformly is technically very difficult. For that reason attempts have been made to coat the glass first and to deform it subsequently. To deform a pane it must be heated to very high temperatures. During the heating, the coating is often damaged.

Brief heating to temperatures of approximately 700° C. with subsequent rapid cooling is also carried out with non-bent panes, if these are to acquire special properties, for example for reasons of safety, the property of shattering into small glass splinters in the event they are damaged. If these non-bent glasses are coated, the layers tend to peel off or form bubbles after they are heated. Due to the bubble formation, hazing of the window panes occurs, which, above approximately 0.5%, is perceived as disturbing.

The goal is therefore to provide coatings which upon heating of the glass do not peel off and do not form bubbles. Changes of the color values and changes of other optical properties are also undesirable.

A method for the production of bent and/or hardened coated glass is already known, in which the coating comprises at least one metal with an atomic number between 22 and 29, and a thin aluminum layer is applied over the coating (EP 0 301 755 B1).

A method for the production of heat-treated coated glass is furthermore known, in which first a solar control layer or an electrically conducting layer is applied onto a glass substrate. Upon it is applied a protective layer transparent in the range of visible light, which comprises a material from the group boron nitride, silicon nitride, boronitride, siliconitride, carbon nitride, etc. (EP 0 546302 B1=DE 692 20 901 T2). The solar control layer here comprises a metal from the group including steel, titanium, chromium, zirconium, tantalum and hafnium and a nitride, boride or carbide of this metal. Onto the first protective layer a second protective layer can still be applied, which preferably comprises a metal oxide, for example titanium oxide or silicon oxide.

Furthermore, a coated glass is also known which can be exposed to heat treatments and which comprises a dielectric base layer, a metallic intermediate layer and an outer dielectric layer (EP 0 962 429 A1). The base layer comprises here $SiO_2$, $Al_2O_3$, SiON, $Si_3N_4$ or AlN, while the intermediate layer comprises CrAl, CrSi and Si. The outer dielectric layer comprises $Si_3N_4$ or AlN or a mixture of the two.

Lastly, a heat-absorbing glass is also known, which includes a heat-absorbing film preferably comprised of a metal nitride or metal oxinitride (EP 0 530 676 B1=DE 692 07 518 T2). Between the glass and the heat-absorbing film a transparent dielectric film, for example comprised of $Si_3N_4$, can additionally be provided.

The invention addresses the problem of providing a coating on a substrate which can withstand the temperature stresses during the bending of the substrate.

This problem is solved through the characteristics of patent claim 1.

One advantage attained with the invention lies therein that the number of rejects in a mass production of coated substrates, which are subsequently bent through tempering, is very low. A further advantage of the invention is the realization of specific color values. In addition, the absorbing layer comprised of CrN, Cr, Ni, NiCr, NiCrN or $NiCrO_x$ itself is protected against impurities in the layer system during the tempering. Furthermore antireflection coating is attained resulting in low reflectance.

Figure 2:
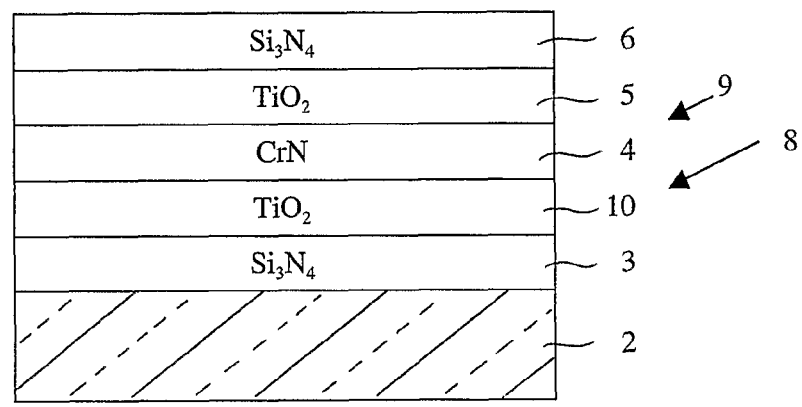
Figure 3:
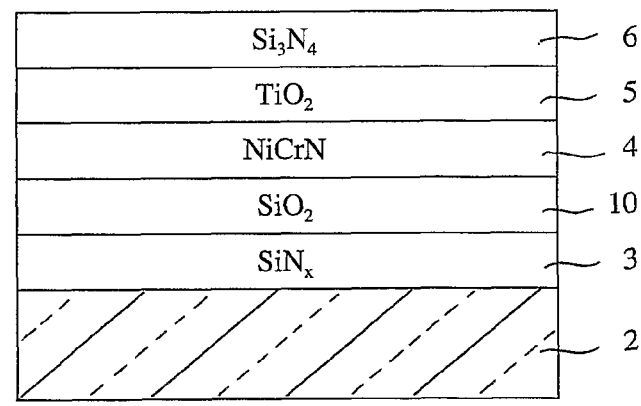

Embodiment examples of the invention are shown in the drawing and will be described in further detail in the following. In the drawing depict:

FIG. 1 a glass coating comprised of four layers,
FIG. 2 a glass coating comprised of five layers,
FIG. 3 a glass coating comprised of five layers.

FIG. 1 shows a coated substrate 1, which is comprised of the substrate 2 itself—for example glass—and a coating 7 including four layers 3 to 6. The four layers 3 to 6 are sequentially, starting with substrate 2, $Si_3N_4$, CrN, $TiO_2$, $Si_3N_4$. Thus, disposed directly on the substrate 2 first a layer 3 of $Si_3N_4$, on it a layer 4 of CrN, on it a layer 4 of CrN, on it a layer 5 of $TiO_2$ succeeding it a layer 6 of $Si_3N_4$.

The layers 3 and 6 have a thickness of 20 to 120 nm, while the layer 4 has a thickness of 5 to 40 nm. The layer 5 has a thickness of 4 to 120 nm.

In FIG. 2 is shown a further coated substrate 8 with a modified coating 9. The coating 9 differs from coating 7 in that between layers 3 and 4 a further layer 10 is inserted, which is comprised of $TiO_2$ and has a layer thickness of 4 to 120 nm.

In the embodiment examples layer 5 can also be replaced by a suitable dielectric oxide layer other than $TiO_2$, for example by $N_2O_5$. Instead of CrN as layer 4, NiCrN, NiCr or $NiCrO_x$ can also be employed. Of layers 3 and 6 at least one can be comprised of $SiN_x$, and can thus be a substoichiometric layer.

NiCrN or CrN are preferably sputtered in an argon atmosphere to which nitrogen has been added. In contrast, $NiCrO_x$ is preferably sputtered in an argon atmosphere with the addition of oxygen.

In FIG. 3 is shown a further variant of a coating with five layers, in which a transparent $SiN_x$ layer 3 is succeeded by an $SiO_2$ layer 10.

It would also be possible to provide a semimetallic NiCo Cr—N layer or a CoCrN layer or a substoichiometric NiCo $CrN_x$ or $CoCrN_x$ layer instead of an NiCrN layer 4.

The disposition of the two upper layers 5 and 6 is essential. The topmost layer 6 is comprised of $Si_3N_4$ and represents a chemically and mechanically highly stable layer. In addition, $Si_3N_4$ is temperature stable and can inhibit diffusing atoms and/or molecules, which can lead to concentrations of these molecules at the interface layer with layer 5. The $Si_3N_4$ layer acts virtually as a hard wall for diffusing foreign atoms. If these foreign atoms are for example $Na^+$, this can lead to the liquefaction of the layer 5. The layer system would consequently no longer be thermally stable.

With an index of refraction n=2.0 at a wavelength of $\lambda$=540 nm, $Si_3N_4$ can be considered to have low refractivity in comparison to $TiO_2$.

Layer 5 comprised of $TiO_2$ is also a chemically and mechanically stable layer, which, moreover, is temperature stable. $TiO_2$ can absorb diffusing atoms/molecules, which leads to the concentration of these atoms/molecules in the $TiO_2$ layer. $TiO_2$ acts practically like a sponge for diffusing foreign atoms, such as occur in particular in the temperature treatment of the layer system. With a refractive index of n=2.4-2.6 at a wavelength $\lambda$=540 nm, $TiO_2$ is among the high refractivity dielectric materials.

Since the $Si_3N_4$ layer and the $TiO_2$ layer have different refractive indices, the sequence in which they occur is of great significance for the optical properties of the combined layers 5 and 6. Exchanging the sequence of $TiO_2$ and $Si_3N_4$ leads to entirely different optical properties. For example, antireflection depends strongly on the sequence of the dielectric layers. If the low refractivity dielectric layer is closer to the glass 2 than the high refractivity dielectric, reflection coating takes place. However, if the layers are reversed, antireflection coating is obtained.

By exchanging the two dielectric layers 5 and 6, a different color space also results. The combinations of color values, for example a*, B* and reflectivity, accessible with the particular layer sequences have only a small intersection. Therefore specific colors can only be attained with the combination according to the invention of the upper layers.

Layer 4 must be protected against $Na^+$ ions which are emitted from the glass when a coated glass pane is heated. This task is assumed by layer 3, which is comprised for example of $Si_3N_4$. But, under thermal effects foreign atoms in layers 3 to 6, 10 can also chemically change adjacent layers and even destroy them. It is known that $TiO_2$ can bind foreign atoms very well without itself being destroyed. Hereby the absorbing layer 4 is protected.

It is especially important to keep oxygen away from layer 4. If oxygen enters this layer, the absorption of light changes drastically. If layer 4 is only embedded in $Si_3N_4$, this $Si_3N_4$ must not have any defects, for otherwise oxygen penetrates it. If, in contrast, an additional layer 5 is provided which can capture oxygen, the protective effect of the layers 3 and 5, embedding layer 4, is markedly increased. This is especially evident at the margin of a coated substrate 2, because here the oxygen also has the capacity of attacking layer 4 laterally. The $Si_3N_4$ layer can only act perpendicularly to its surface. Since the $TiO_2$ layer 5 does not block oxygen but incorporates it, this layer 5 acts as a protection until it is saturated.

If the upper layers 5 and 6 are interchanged, into the $TiO_2$ layer, which is now the topmost layer, oxygen and other foreign atoms, for example $Na^+$, are incorporated during the tempering. In this case at the barrier layer to the $Si_3N_4$ layer concentrations of oxygen and/or other foreign atoms can form, which, in the extreme case, can also destroy the $TiO_2$ layer.

With the dispositions of layers 5 and 6 depicted in FIG. 1 and 2, in contrast, only a very small quantity of oxygen and/or other foreign atoms passes through the barrier layer 6, such that only a small number of the atoms or molecules are incorporated into the $TiO_2$ layer. Consequently, the $TiO_2$ layer 5 has still some capacity available for absorbing internal impurities.

In the following the process parameters for the production of layers $Si_3N_4$, $TiO_2$ and CrN will be described.

The $Si_3N_4$ layers were deposited from a polycrystalline Si target in an argon-nitrogen atmosphere. The layer thickness was varied through the transport rate. The dielectric titanium oxide layers were deposited from a metallic Ti target in an argon-oxygen atmosphere, while the semimetallic CrN or NiCrN layers were deposited from metallic Cr or NiCr targets in an argon-nitrogen atmosphere. The relevant process parameters are shown in the following Table:

| Layer | Ar [sccm] | $N_2$ [sccm] | $O_2$ [sccm] | P [kW] | U [V] | I [A] | Pressure [μbar] |
|---|---|---|---|---|---|---|---|
| $Si_3N_4$ | 250 | 110 | — | 17.5 | 302 | 43.6 | 3.2 |
| $TiO_2$ | 280 | — | 90 | 24 | 305 | 48 | 2.7 |
| CrN | 150 | 25 | — | 5 | 392 | 12.7 | 2.6 |

Process Parameters of the Individual Layers

P herein is the electric power, U the electric voltage and I the electric current of a sputter process. Ar, $N_{2+}$, $O_2$ indicate the particular gas flow in sccm: standard cubic centimeters per minute.

Samples of each layer system were produced and for 10 minutes exposed in a tempering furnace to a temperature of 700° C. for 10 minutes. All samples were subjected to a Taber test. Before the stress tests the optical data and the scattered light component (haze) of the tempered and untempered samples were determined.

Optical Data

The changes of the optical values for the tested layer systems are summarized in the following Table:

| Type | Sample No. | $Si_3N_4$ Thickness [Å] | $TiO_2$ Thickness [Å] | $CrN_x$ Thickness [Å] | $TiO_2$ Thickness [Å] | $Si_3N_4$ Thickness [Å] | Change through Tempering Process | | | | | |
|---|---|---|---|---|---|---|---|---|---|---|---|---|
| | | | | | | | Ty | a*T | b*T | RyG | a*R | b*R |
| A | 1 | 600 | 213 | 160 | 82 | 300 | 0.7 | −1.3 | −1.1 | 2.3 | −1.2 | −0.9 |
| A | 2 | 500 | 213 | 160 | 82 | 300 | 1.8 | −1.6 | −1.5 | 0.1 | 0.3 | −2.8 |
| A | 3 | 600 | 213 | 160 | 82 | 300 | 1.7 | −1.5 | −1.2 | 0.6 | 0.0 | −1.1 |
| B | 1 | 760 | | 160 | 82 | 300 | 0.1 | −1.4 | 0.0 | 2.7 | −0.8 | 1.1 |
| B | 2 | 760 | | 160 | 82 | 300 | 0.5 | −1.6 | 1.1 | 2.2 | −0.6 | 0.0 |
| C | 1 | | 950 | 180 | 82 | 400 | −4.7 | 0.1 | −1.2 | 16.0 | 4.7 | 3.9 |
| C | 2 | | 1000 | 180 | 82 | 400 | −3.8 | −0.8 | −0.8 | 13.4 | 3.7 | −0.5 |
| C | 3 | | 640 | 160 | 82 | 300 | −4.5 | −1.0 | −3.0 | 9.6 | −0.2 | 7.5 |

Optical Values and Layer Resistance Before and after Tempering (HT)

Ty is the light transmission of the calorimetric measure system $Y_{xy}$ (CIE 1931), RyG the glass-side light reflection Y of the calorimetric measure system $Y_{xy}$ (CIE 1931), thus the reflection of the uncoated substrate side. The values a* and b* are color coordinates corresponding to the L*a*b* system (CIELab Farbenraum, DIN 7174). Specifically, a*T or b*T are the respective a* or b* value of the transmission, while a*R or b*R indicate the a* respectively b* color value of the reflection. The CIELab system has three coordinate axes, which are at right angles to one another. L* is the brightness axis, a* the red-green axis and b* the yellow-blue axis.

sample after the Taber test minus the transmission of the sample before the Taber test. The Taber test is carried out on tempered and on untempered samples. Since the Taber test is a destructive test, the comparison "before tempering" and "after tempering" cannot be carried out on one and the same sample.

Haze

The third important parameter is the loss through scattering.

| Type | Sample No. | $Si_3N_4$ Thickness [Å] | $TiO_2$ Thickness [Å] | $CrN_x$ Thickness [Å] | $TiO_2$ Thickness [Å] | $Si_3N_4$ Thickness [Å] | Haze before tempering | Haze after tempering |
|---|---|---|---|---|---|---|---|---|
| A | 1 | 600 | 213 | 160 | 82 | 300 | 0.33 | 0.49 |
| A | 2 | 500 | 213 | 160 | 82 | 300 | 0.27 | 0.44 |
| A | 3 | 600 | 213 | 160 | 82 | 300 | 0.40 | 0.43 |
| B | 1 | 760 |  | 160 | 82 | 300 | 0.31 | 0.40 |
| B | 2 | 760 |  | 160 | 82 | 300 | 0.48 | 0.44 |
| C | 2 |  | 1000 | 180 | 82 | 400 | 0.53 | 2.50 |
| C | 3 |  | 640 | 160 | 82 | 300 | 0.28 | 3.44 |

Type A, type B and type C denote the tested samples with the following layer systems:

Type A: glass/$Si_3N_4$/$TiO_2$/CrN/$TiO_2$/$Si_3N_4$ (cf. FIG. 2)

Type B: glass/$Si_3N_4$CrN/$TiO_2$/$Si_3N_4$ (cf. FIG. 1)

Type C: glass/$TiO_2$/CrN/$TiO_2$/$Si_3N_4$ (cf. FIG. 2 minus layer 3)

The tested layer systems of type A and B have only minor changes in the optical data. This obviously does not apply to the counter-example C.

Taber Test

The Taber test provides information about the mechanical loading capacity of a coating. The transmission is measured before and after the mechanical stress. An increase of the transmission by more than 2% is not acceptable.

Scattered Light Component (Haze) Before and after Tempering

These data also show: the layer system C is destroyed by the tempering process, while the layer systems of type A and B do not show an increased scattered light component after the tempering.

It was found in especially temperature-sensitive layer systems that graduated layers make possible a stepped adaptation of the physical parameters (especially of the coefficient of thermal expansion), which has an extremely advantageous effect on the thermal stability and, consequently, on the tempering process. This elasto-mechanical adaptation of the interfaces is known, for example from the field of production of glass fibers for optical telecommunication technology. In this case, the material dopings are also gradually adapted at

| Type | Sample No. | $Si_3N_4$ Thickness [Å] | $TiO_2$ Thickness [Å] | $CrN_x$ Thickness [Å] | $TiO_2$ Thickness [Å] | $Si_3N_4$ Thickness [Å] | ΔT before tempering | ΔT after tempering |
|---|---|---|---|---|---|---|---|---|
| A | 1 | 600 | 213 | 160 | 82 | 300 | 0.7 | 0.2 |
| A | 2 | 500 | 213 | 160 | 82 | 300 | 1.1 | 0.4 |
| A | 3 | 600 | 213 | 160 | 82 | 300 | 1.2 | 0.4 |
| B | 1 | 760 |  | 160 | 82 | 300 | 0.6 | 0.9 |
| B | 2 | 760 |  | 160 | 82 | 300 | 0.4 | 0.8 |
| C | 1 |  | 950 | 180 | 82 | 400 | 1.2 | 4.0 |
| C | 2 |  | 1000 | 180 | 82 | 400 | 1.8 | 2.6 |
| C | 3 |  | 640 | 160 | 82 | 300 | 1.7 | 3.1 |

Change of Transmission Through the Taber Test Before and after Tempering

The coatings of type A and B pass the Taber test without problems. This applies especially to the tempered samples. The tempered samples of the layer system C do not pass the Taber test. ΔT indicates the difference of transmission of a interfaces in order to minimize mechanical tensions in glass forming processes (fiber drawing).

The invention claimed is:

1. A coating for a substrate consisting essentially of a transparent $Si_3N_4$ or $SiN_x$ layer applied directly on the substrate, a semimetallic layer above the $Si_3N_4$ or $SiN_x$ layer, a further $Si_3N_4$ or $SiN_x$ layer, and a dielectric oxide layer selected from the group consisting of $Al_2O_3$, SnO, $Nb_2O_5$, $TiO_2$ and $SiO_2$, wherein the dielectric oxide layer is disposed on the semimetallic layer, and the further $Si_3N_4$ layer is disposed on the dielectric oxide layer.

2. The coating for a substrate as claimed in claim 1, wherein the semimetallic layer comprises a CrN, NiCrN or NiCrO layer.

3. The coating for a substrate as claimed in claim 1, wherein a dielectric oxide layer is provided between the transparent $Si_3N_4$ or $SiN_x$ layer and the semimetallic layer.

4. The coating for a substrate as claimed in claim 1, wherein x is a number smaller than 4/3.

5. A coating for a substrate as claimed in claim 1, wherein the transparent $Si_3N_4$ or $SiN_x$ layers have each a layer thickness of 20 to 120 nm.

6. A coating for a substrate as claimed in claim 1, wherein the dielectric oxide layers have each a layer thickness of 4 to 120 nm.

7. A coating for a substrate as claimed in claim 1, wherein the semimetallic NiCrN, CrN or $NiCrO_x$ layers have a layer thickness of 5 to 40 nm.

8. A coating for a substrate as claimed in claim 1, wherein said substrate is glass.

9. A coating for a substrate as claimed in claim 1, wherein said substrate is a synthetic material.

10. A coating for a substrate consisting essentially of a transparent $Si_3N_4$ or $SiN_x$ layer applied directly on the substrate, a semimetallic layer above the $Si_3N_4$ or $SiN_x$ layer, a further $Si_3N_4$ or $SiN_x$ layer, and a dielectric oxide layer selected from the group consisting of $Al_2O_3$, SnO, $Nb_2O_5$, $TiO_2$ and $SiO_2$, wherein the dielectric oxide layer is disposed on the semimetallic layer, and the further $Si_3N_4$ layer is disposed on the dielectric oxide layer, wherein the coating comprises additional layers comprising Cr, Ni or NiCr.

* * * * *